E. PUTNAM.
Hand Corn-Planter.

No. 221,973. Patented Nov. 25, 1879.

UNITED STATES PATENT OFFICE.

EPHRAIM PUTNAM, OF PLATTSBURG, NEW YORK.

IMPROVEMENT IN HAND CORN-PLANTERS.

Specification forming part of Letters Patent No. 221,973, dated November 25, 1879; application filed May 22, 1879.

*To all whom it may concern:*

Be it known that I, EPHRAIM PUTNAM, of Plattsburg, in the county of Clinton and State of New York, have invented certain new and useful Improvements in Hand Seed-Planters; and I do hereby declare that the following is a full, clear, and exact description thereof, reference being had to the accompanying drawings, and to the letters of reference marked thereon, which form part of this specification.

The nature of my invention consists in the construction and arrangement of a combined hoe and seed-planter, as will be hereinafter more fully set forth.

In order to enable others skilled in the art to which my invention appertains to make and use the same, I will now proceed to describe its construction and operation, referring to the annexed drawings, in which—

Figure 1:
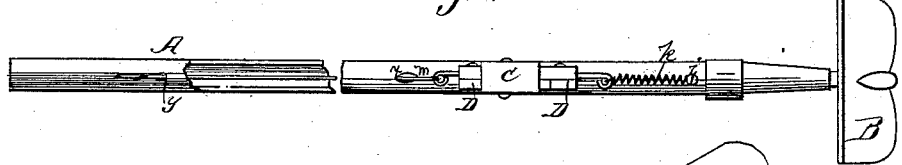
Figure 2:
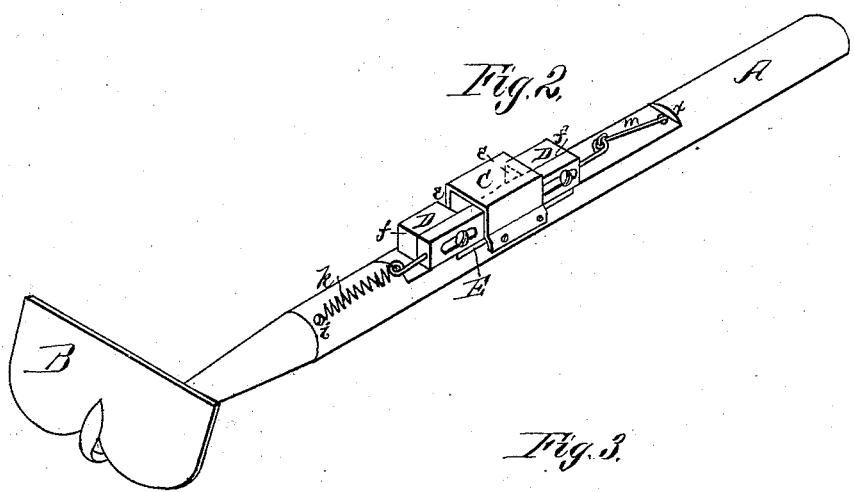
Figure 3:
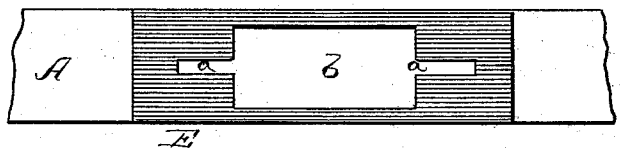
Figure 4:
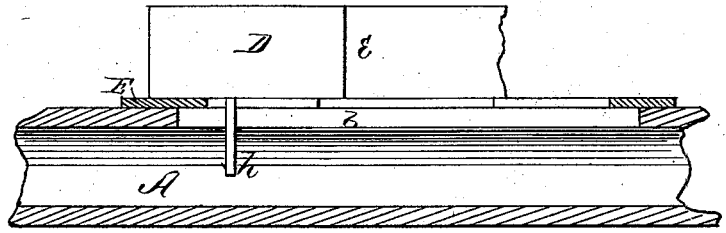

Figure 1 is a view from the under side of my combined hoe and planter. Fig. 2 is a perspective view of the same. Fig. 3 is an enlarged view of a part of the handle. Fig. 4 is a longitudinal section of the same.

A represents the hoe-handle, provided at the lower end with a hoe-blade, B, secured in or to the handle in any suitable or convenient manner.

The handle A is made hollow from its upper end downward to within a suitable distance from the lower end, where the hoe-blade is secured. On the under side of the handle A is secured an open-ended box or keeper, C, in which is placed a slide, D, projecting beyond both ends of the keeper. This slide covers an opening, *b*, in the handle and a slot, *a*, extending from each end of said opening. Between the slide D and the handle A is placed a piece of rubber or rubber cushion, E, which is fastened to the handle, and cut out to correspond with the opening *b* and slots *a a*.

The slide D is formed with two dropping-openings, *e e*, which may be adjusted in size so as to drop a larger or smaller quantity of seed, as desired, by moving the pieces *f f* at the ends of the slide either in or out, said pieces being held in place by screws passing through slots in the main part of the slide.

To the lower side of the slide D, near each end, is attached a pin, *h*, which extends down through the slot *a* in the handle, and acts as a stirrer to agitate the corn or other seed.

To the lower end of the slide is attached a spring, *k*, which is fastened to the handle by a screw, *i*; and to the upper end of the slide is attached a rod, *m*, which passes into the handle at *x*, then up inside of the same, and then out again at *y*, where the end of the said rod forms a suitable handle.

The operation of my device is as follows: The hollow handle A is wholly or partially filled with corn or other seed to be planted. The operator pushes up the ground with the hoe-blade, then pulls upward on the rod *m*, which draws the slide up, so that the corn in the upper dropping-opening *e* will fall out at the top of the keeper C. While yet holding the rod *m*, the operator draws backward on the hoe to cover the corn, and then again pushes up the ground for the next hill. By now slacking up on the rod *m* the spring *k* will draw down the slide D, so that the corn in the lower dropping-opening *e* will fall out at the lower end of the keeper; and so on continue till the whole row is planted.

The rubber cushion E prevents any injury to the grain which would occur when any grains were caught between the edges of the slide and handle.

When desired, the planting mechanism can easily be removed, and the hoe alone used, the same as an ordinary hoe.

Having thus fully described my invention, what I claim as new, and desire to secure by Letters Patent, is—

1. In a hand-planter, the combination of the hollow hoe-handle A, keeper C, and the slide D, having adjustable end pieces, *f f*, with the spring *k* and the rod *m*, working within the handle, substantially as and for the purposes herein set forth.

2. The agitators *h h*, attached to the slide D, in combination with said slide, slotted rubber cut-off E, and the hollow handle A, for the purposes herein set forth.

In testimony that I claim the foregoing as my own I affix my signature in presence of two witnesses.

EPHRAIM PUTNAM.

Witnesses:
T. H. ALEXANDER,
W. C. MCARTHUR.